US010964308B2

(12) United States Patent
Kainuma

(10) Patent No.: US 10,964,308 B2
(45) Date of Patent: Mar. 30, 2021

(54) SPEECH PROCESSING APPARATUS, AND PROGRAM

(71) Applicant: Ken-ichi Kainuma, Tokyo (JP)

(72) Inventor: Ken-ichi Kainuma, Tokyo (JP)

( * ) Notice: Subject to any disclaimer, the term of this patent is extended or adjusted under 35 U.S.C. 154(b) by 0 days.

(21) Appl. No.: 16/759,817

(22) PCT Filed: Oct. 29, 2018

(86) PCT No.: PCT/JP2018/040062
§ 371 (c)(1),
(2) Date: Apr. 28, 2020

(87) PCT Pub. No.: WO2020/089961
PCT Pub. Date: May 7, 2020

(65) Prior Publication Data
US 2021/0027760 A1 Jan. 28, 2021

(51) Int. Cl.
*G10L 13/033* (2013.01)
*G10L 13/10* (2013.01)

(52) U.S. Cl.
CPC ............ *G10L 13/033* (2013.01); *G10L 13/10* (2013.01)

(58) Field of Classification Search
CPC ....... G10L 13/033; G10L 13/10; G10L 15/00; G10L 2015/025; G10L 2013/105;
(Continued)

(56) References Cited

U.S. PATENT DOCUMENTS 9,094,576 B1 * 7/2015 Karakotsios ........... H04N 7/157
2002/0111794 A1 8/2002 Yamamoto et al.
(Continued)

FOREIGN PATENT DOCUMENTS

JP H07-072900 A 3/1995
JP 2002-244688 A 8/2002
(Continued)

OTHER PUBLICATIONS

Jalalifar SA, Hasani H, Aghajan H. Speech-driven facial reenactment using conditional generative adversarial networks. arXiv preprint arXiv:1803.07461. Mar. 20, 2018. (Year: 2018).*

(Continued)

*Primary Examiner* — Paras D Shah
*Assistant Examiner* — Nicole A Kotulak
(74) *Attorney, Agent, or Firm* — Hamess, Dickey & Pierce, P.L.C.

(57) ABSTRACT

A speech processing apparatus is provided in which, while face feature points are extracted from moving image data obtained by imaging a speaker's face, for each frame, a first generation network for generating face feature points of the corresponding frame based on speech feature data extracted from uttered speech of the speaker for each frame is generated, and whether the first generation network is appropriate is evaluated using an identification network, then, a second generation network for generating the uttered speech from a plurality of uncertain settings including at least text representing utterance content of the uttered speech and information indicating emotions included in the uttered speech, a plurality of types of fixed settings which define speech quality, and the face feature points generated by the first generation network evaluated as appropriate, is generated, and whether the second generation network is appropriate is evaluated using the identification network.

12 Claims, 9 Drawing Sheets

(58) Field of Classification Search
CPC ...... G10L 25/00; G06N 3/02; G06K 9/00335; G06F 3/00
USPC .......................................................... 704/260
See application file for complete search history.

(56) References Cited

U.S. PATENT DOCUMENTS

| | | |
|---|---|---|
| 2010/0250257 A1 | 9/2010 | Hirose et al. |
| 2010/0332229 A1* | 12/2010 | Aoyama ................ H04N 5/232 704/251 |
| 2011/0305384 A1* | 12/2011 | Aoyama ................ G10L 25/78 382/159 |
| 2017/0076714 A1 | 3/2017 | Mori et al. |
| 2018/0182373 A1* | 6/2018 | Almudafar-Depeyrot ................... G10L 13/00 |
| 2018/0285456 A1* | 10/2018 | Nichkawde .......... G11B 27/031 |
| 2018/0342258 A1* | 11/2018 | Huffman ................ G10L 15/02 |
| 2019/0087734 A1* | 3/2019 | Ide .......................... G10L 17/00 |
| 2020/0051545 A1 | 2/2020 | Iwase et al. |

FOREIGN PATENT DOCUMENTS

| | | |
|---|---|---|
| JP | 2003-248837 A | 9/2003 |
| JP | 2017-058411 A | 3/2017 |
| WO | 2008-149547 A1 | 12/2008 |
| WO | 2018-168427 A1 | 9/2018 |

OTHER PUBLICATIONS

Suwajanakorn S, Seitz SM, Kemelmacher-Shlizerman I. Synthesizing obama: learning lip sync from audio. ACM Transactions on Graphics (TOG). Jul. 20, 2017;36(4):1-3. (Year: 2017).*

* cited by examiner

Figure 10

Level=1

|   |   | C | M | Y | K | R | G | B |
|---|---|---|---|---|---|---|---|---|
| A | rage | 0 | 100 | 100 | 0 | 255 | 0 | 0 |
| B | combative | 20 | 90 | 100 | 0 | 204 | 26 | 0 |
| C | arrogant | 40 | 80 | 100 | 0 | 153 | 51 | 0 |
| D | ambitious | 60 | 70 | 100 | 0 | 102 | 77 | 0 |
| E | exhilliration | 50 | 0 | 100 | 0 | 128 | 255 | 0 |
| F | optimistic | 74 | 0 | 97 | 0 | 66 | 255 | 8 |
| G | awe | 100 | 0 | 100 | 0 | 0 | 255 | 0 |
| H | fulfilled | 100 | 0 | 50 | 0 | 0 | 255 | 128 |
| I | serene | 100 | 0 | 30 | 0 | 0 | 255 | 179 |
| J | calm | 100 | 0 | 0 | 0 | 0 | 255 | 255 |
| K | introspective | 94 | 33 | 0 | 10 | 14 | 154 | 230 |
| L | apathetic | 94 | 84 | 0 | 20 | 12 | 33 | 204 |
| M | sorrow | 23 | 93 | 0 | 30 | 137 | 12 | 179 |
| N | anguish | 0 | 96 | 0 | 40 | 153 | 6 | 153 |
| O | terror | 0 | 95 | 38 | 50 | 128 | 6 | 79 |
| P | panic | 0 | 95 | 68 | 60 | 102 | 5 | 33 |

Level=2

|   |   | C | M | Y | K | R | G | B |
|---|---|---|---|---|---|---|---|---|
| A | anger | 0 | 80 | 80 | 0 | 255 | 51 | 51 |
| B | aggressive | 15 | 70 | 80 | 0 | 217 | 77 | 51 |
| C | prideful | 35 | 60 | 80 | 0 | 166 | 102 | 51 |
| D | motivated | 50 | 50 | 80 | 0 | 128 | 128 | 51 |
| E | joy | 35 | 0 | 70 | 0 | 166 | 255 | 77 |
| F | positive | 59 | 0 | 72 | 0 | 105 | 255 | 71 |
| G | amazement | 76 | 0 | 76 | 0 | 61 | 255 | 61 |
| H | gratified | 76 | 0 | 36 | 0 | 61 | 255 | 163 |
| I | tranquil | 70 | 0 | 60 | 0 | 77 | 255 | 102 |
| J | soothed | 80 | 0 | 0 | 0 | 51 | 255 | 255 |
| K | pensive | 73 | 25 | 0 | 8 | 63 | 176 | 235 |
| L | bored | 74 | 65 | 0 | 16 | 56 | 75 | 214 |
| M | sadness | 22 | 71 | 0 | 24 | 151 | 56 | 194 |
| N | distressed | 0 | 70 | 0 | 32 | 173 | 52 | 173 |
| O | horrified | 0 | 66 | 25 | 40 | 153 | 52 | 115 |
| P | agitated | 0 | 66 | 46 | 48 | 133 | 45 | 72 |

Figure 11

Level=3

|   |              | C  | M  | Y  | K  | R   | G   | B   |
|---|--------------|----|----|----|----|-----|-----|-----|
| A | frustrated   | 0  | 60 | 60 | 0  | 255 | 102 | 102 |
| B | competitive  | 10 | 45 | 60 | 0  | 230 | 140 | 102 |
| C | confident    | 20 | 35 | 60 | 0  | 204 | 166 | 102 |
| D | inspired     | 30 | 25 | 60 | 0  | 179 | 191 | 102 |
| E | happy        | 26 | 0  | 52 | 0  | 189 | 255 | 122 |
| F | hopeful      | 50 | 10 | 60 | 0  | 128 | 230 | 102 |
| G | admiration   | 58 | 0  | 58 | 0  | 107 | 255 | 107 |
| H | pleased      | 55 | 0  | 25 | 0  | 115 | 255 | 191 |
| I | peaceful     | 57 | 0  | 17 | 0  | 110 | 255 | 212 |
| J | relaxed      | 60 | 0  | 0  | 0  | 102 | 255 | 255 |
| K | thoughtful   | 51 | 18 | 0  | 5  | 119 | 199 | 242 |
| L | uninterested | 56 | 50 | 0  | 10 | 101 | 115 | 230 |
| M | depressed    | 18 | 46 | 0  | 15 | 178 | 117 | 217 |
| N | concerned    | 0  | 50 | 0  | 20 | 204 | 102 | 204 |
| O | fearful      | 0  | 43 | 15 | 25 | 191 | 109 | 163 |
| P | anxious      | 0  | 43 | 27 | 30 | 179 | 102 | 130 |

Level=4

|   |              | C  | M  | Y  | K  | R   | G   | B   |
|---|--------------|----|----|----|----|-----|-----|-----|
| A | irritated    | 0  | 40 | 40 | 0  | 255 | 153 | 153 |
| B | assertive    | 5  | 40 | 40 | 0  | 242 | 153 | 153 |
| C | secure       | 10 | 30 | 40 | 0  | 230 | 179 | 153 |
| D | encouraged   | 15 | 20 | 40 | 0  | 217 | 204 | 153 |
| E | delighted    | 17 | 0  | 35 | 0  | 212 | 255 | 166 |
| F | assured      | 26 | 0  | 36 | 0  | 189 | 255 | 163 |
| G | appreciation | 38 | 0  | 38 | 0  | 158 | 255 | 158 |
| H | satisfied    | 36 | 0  | 14 | 0  | 163 | 255 | 219 |
| I | gentle       | 38 | 0  | 13 | 0  | 158 | 255 | 222 |
| J | quiet        | 40 | 0  | 0  | 0  | 153 | 255 | 255 |
| K | wistful      | 28 | 10 | 0  | 3  | 178 | 223 | 247 |
| L | indifferent  | 38 | 31 | 0  | 9  | 144 | 160 | 232 |
| M | gloom        | 13 | 26 | 0  | 12 | 195 | 166 | 224 |
| N | worried      | 0  | 30 | 0  | 15 | 217 | 152 | 217 |
| O | scared       | 0  | 23 | 5  | 18 | 209 | 161 | 199 |
| P | alarmed      | 0  | 21 | 10 | 21 | 201 | 159 | 181 | ns and a second evaluating
SPEECH PROCESSING APPARATUS, AND PROGRAM

CROSS REFERENCE TO RELATED APPLICATION

This application is a U.S. National Phase Application under 35 U.S.C. 371 of International Application No. PCT/JP2018/040062, filed on Oct. 29, 2018. The entire disclosure of the above application is incorporated herein by reference.

BACKGROUND

Technical Field

The present invention relates to a speech processing apparatus and a program for performing speech analysis and speech synthesis based on the analysis result.

Related Art

Techniques for electrically synthesizing speech, such as so-called vocaloids, are commonly in widespread use. Typically, factors which influence speech quality of speech include gender, voice pitch, utterance speed, accent emphasis, volume, and the like, and a technique for synthesizing speech having desired speech quality by designating these factors has also been proposed (see, for example, Japanese Patent Laid-Open No. 05-053595).

While factors which influence speech quality of speech include age, height, weight, and the like, of a speaker in addition to gender, voice pitch, utterance speed, accent emphasis, and volume, in the technique disclosed in Japanese Patent Laid-Open No. 05-053595, age, height, weight, and the like, of a speaker are not taken into account. Note that, in the following, settings which are uniquely determined for each speaker, such as gender, age, height, and weight of the speaker will be referred to as "fixed settings". Further, when human-like speech is synthesized, while it is important to include emotions such as delight, anger, sorrow and pleasure, in the technique disclosed in Japanese Patent Laid-Open No. 05-053595, reflection of emotions is not taken into account.

The present invention has been made in view of the above-described circumstances, and an object of the present invention is to provide a technique for making it possible to synthesize emotional speech while taking into account fixed settings of a speaker.

SUMMARY

In order to solve the above-described problem, the present invention provides a speech processing apparatus including an extracting means configured to separate moving image data obtained by imaging a face of a speaker in an utterance period into frames having a predetermined time length, and extract face feature point data indicating positions of face feature points determined in advance, for each frame, a first generating means configured to separate speech data representing uttered speech of the speaker in the utterance period into the frames and generate a first generation network for generating face feature points of each frame from speech feature data of the corresponding frame, a first evaluating means configured to evaluate whether or not the first generation network is appropriate using the face feature point data extracted from each frame using a first identification network, a second generating means configured to cause a user to designate a plurality of types of uncertain settings including at least text representing utterance content of the uttered speech and information indicating emotions included in the uttered speech, cause the user to designate a plurality of types of fixed settings which define speech quality of the speaker, and generate a second generation network for generating the uttered speech from the face feature points generated by the first generation network evaluated as appropriate by the first evaluating means, the plurality of types of fixed settings and the plurality of types of uncertain settings designated by the user, and a second evaluating means configured to evaluate whether or not the second generation network is appropriate using the speech data using a second identification network.

According to the speech processing apparatus of the present invention, it is possible to generate the second generation network for synthesizing emotional speech while taking into account the fixed settings of the speaker, and by synthesizing speech using the second generation network, it is possible to synthesize emotional speech while taking into account the fixed settings of the speaker.

The speech processing apparatus in a more preferred aspect includes a designation accepting means configured to encourage the user to designate fixed settings and uncertain settings for speech to be synthesized, and a speech synthesizing means configured to synthesize speech corresponding to the fixed settings and the uncertain settings designated for the designation accepting means using the second generation network evaluated as appropriate by the second evaluating means.

According to the speech processing apparatus of the present aspect, it is possible to synthesize speech which has speech quality corresponding to the fixed settings designated by the user and which has the uncertain settings (speech contents and emotions) designated by the user.

In the speech processing apparatus in a further preferred aspect, the designation accepting means displays a color map in which different colors are associated with respective emotions, on a display apparatus, and causes the user to designate emotions to be included in speech to be synthesized through designation of colors.

According to the speech processing apparatus of the present aspect, it is possible to designate emotions to be included in the speech to be synthesized by designating colors.

In the speech processing apparatus in a further preferred aspect, the designation accepting means accepts more designations of information indicating emotions as a character string length of text is longer.

According to the speech processing apparatus of the present aspect, it is possible to synthesize speech having emotional ups and downs by designating a plurality of emotions in the utterance period of the speech to be synthesized.

In the speech processing apparatus in a further preferred aspect, the second generating means includes a single network generating means configured to generate the second generation network for each setting of the plurality of types of fixed settings and the plurality of types of uncertain settings, a multi-network generating means configured to generate the second generation network so that, for each combination of a plurality of settings except at least one setting among the plurality of types of fixed settings and the plurality of types of uncertain settings, each of the plurality of settings does not affect other settings, and an all-network generating means configured to generate the second network so that each of the plurality of types of fixed settings and the plurality of types of uncertain settings do not affect other settings.

The generation network generated for each setting by the single network generating means may affect other settings, according to the speech processing apparatus of the present aspect, it is possible to adjust a movable region of a vocoder corresponding to each setting so as not to affect other settings by the multi-network generating means and the all-network generating means.

In order to solve the above-described problem, the present invention provides a program for causing a computer to execute an extraction step of separating moving image data obtained by imaging a face of a speaker in an utterance period into frames having a predetermined time length and extracting face feature point data indicating positions of face feature points determined in advance, for each frame, a first generation step of separating speech data representing uttered speech of the speaker in the utterance period into the frames and generating a first generation network for generating face feature points of each frame from speech feature data of the corresponding frame, a first evaluation step of evaluating whether or not the first generation network is appropriate using the face feature point data extracted from each frame using a first identification network, a second generation step of causing a user to designate a plurality of types of uncertain settings including at least text representing utterance content of the uttered speech and information indicating emotions included in the uttered speech, causing the user to designate a plurality of types of fixed settings which define speech quality of the speaker, and generating a second generation network for generating the uttered speech from the face feature points generated by the first generation network evaluated as appropriate in the first evaluation step, the plurality of types of fixed settings and the plurality of types of uncertain settings designated by the user, and a second evaluation step of evaluating whether or not the second generation network is appropriate using the speech data using a second identification network.

According to the program of the present invention, it is also possible to generate a speech model for synthesizing emotional speech while taking into account fixed settings of a speaker.

The program in a more preferred aspect causes the computer to further execute a designation accepting step of encouraging the user to designate fixed settings and uncertain settings for speech to be synthesized, and a speech synthesis step of synthesizing speech corresponding to the fixed settings and the uncertain settings accepted in the designation accepting step using the second generation network evaluated as appropriate in the second evaluation step.

According to the program of the present aspect, it is also possible to synthesize speech which has speech quality corresponding to the fixed settings designated by the user and which has the uncertain settings (speech contents and emotions) designated by the user.

BRIEF DESCRIPTION OF THE DRAWINGS

FIG. 10 is a view illustrating an example of correspondence between emotions and colors in the present embodiment.

FIG. 11 is a view illustrating an example of correspondence between emotions and colors in the present embodiment.

DETAILED DESCRIPTION

An embodiment of the present invention will be described below with reference to the drawings.

Figure 1:
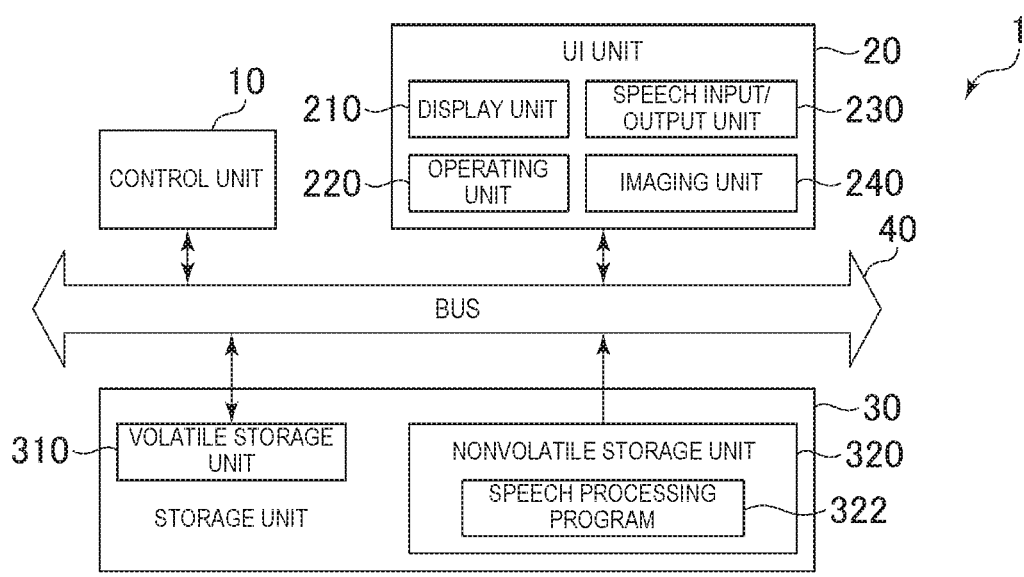
FIG. 1 is a block diagram illustrating a hardware configuration example of a speech processing apparatus 1 according to an embodiment of the present invention.

FIG. 1 is a block diagram illustrating a hardware configuration example of a speech processing apparatus 1 according to an embodiment of the present invention. The speech processing apparatus 1 is, for example, a smartphone. As illustrated in FIG. 1, the speech processing apparatus 1 includes a control unit 10, a user interface unit 20, a storage unit 30, and a bus 40 which mediates data exchange between these components. While, in addition to the components illustrated in FIG. 1, the speech processing apparatus 1 includes a wireless communication unit which wirelessly communicates with a base station of a wireless communication network, the wireless communication unit is less relevant to the present invention, illustration is omitted in FIG. 1. Hereinafter, also in the present specification, detailed description of the wireless communication unit will be omitted. Further, in FIG. 1, "user interface" is abbreviated as "UI", and hereinafter, the same notation will be used in the present specification.

The control unit 10 is, for example, a computer such as a CPU (Central Processing Unit). The control unit 10 executes a program stored in the storage unit 30 (more precisely, a nonvolatile storage unit 320), and functions as a control center of the speech processing apparatus 1.

The UI unit 20 is an aggregate of devices which provide user interface for allowing a user to utilize the speech processing apparatus 1. As illustrated in FIG. 1, the UI unit 20 includes a display unit 210, an operating unit 220, a speech input/output unit 230, and an imaging unit 240.

The display unit 210 is, for example, a liquid crystal display and its drive circuit. The display unit 210 displays various kinds of screen images which encourage the user to utilize the speech processing apparatus 1 under control by the control unit 10. The imaging unit 240 is, for example, an image sensor. The imaging unit 240 captures a moving image within an imaging field of view, and outputs moving image data representing the imaging result to the control unit 10. The operating unit 220 is a transparent sheet-like touch sensor provided so as to cover a display area of the display unit 210. The operating unit 220 forms a so-called touch panel together with the display unit 210. The user of the speech processing apparatus 1 can perform various kinds of input through touch operation or flick operation on the operating unit 220. When the user performs touch operation or flick operation on the operating unit 220, the operating unit 220 outputs data representing the operation of the user to the control unit 10. By this means, the operation performed by the user is transmitted to the control unit 10.

The speech input/output unit 230 includes a microphone, a speaker, an A/D converter, and a D/A converter (none of them are illustrated in FIG. 1). The microphone picks up ambient sound and outputs an analog audio signal representing a waveform of the sound to the A/D converter. The A/D converter performs A/D conversion on the analog audio signal output from the microphone, and outputs sound data (sample sequence obtained by sampling the waveform represented by the analog audio signal to be converted at a predetermined sampling period), which is the conversion result, to the control unit 10. The D/A converter performs D/A conversion on the sound data given from the control unit 10 and outputs an analog audio signal which is the conversion result to the speaker. The speaker emits sound corresponding to the analog audio signal output from the D/A converter.

The storage unit 30 includes a volatile storage unit 310 and a nonvolatile storage unit 320. The volatile storage unit 310 is, for example, a RAM (Random Access Memory). The volatile storage unit 310 is utilized by the control unit 10 as a work area, when a program is executed. The nonvolatile storage unit 320 is, for example, a flash memory. The nonvolatile storage unit 320 stores various kinds of programs and various kinds of data. Specific examples of the programs stored in the nonvolatile storage unit 320 include a kernel program which causes the control unit 10 to implement an OS (Operating System), various kinds of application programs for a web browser and an e-mail client, and a speech processing program 322 which causes the control unit 10 to execute speech processing which prominently represents features of the present embodiment.

Among the programs stored in the nonvolatile storage unit 320, programs other than the speech processing program 322 are not particularly different from those installed in a typical smartphone. For example, the control unit 10 reads out the kernel program from the nonvolatile storage unit 320 to the volatile storage unit 310 when a power supply (not illustrated in FIG. 1) of the speech processing apparatus 1 is turned on, and starts execution of the kernel program. The control unit 10 which operates in accordance with the kernel program and implements the OS can execute the speech processing program 322 and other application programs and can control activation of components other than the control unit 10, such as the UI unit 20 in accordance with an instruction input through operation on the operating unit 220. As described above, because programs other than the speech processing program 322 are not particularly different from those installed in a typical smartphone, detailed description thereof will be omitted, and the speech processing program 322 will be mainly described below.

The control unit 10 which operates in accordance with the speech processing program 322 executes speech processing for synthesizing speech by utilizing a hostile generation network which is one type of a neural network. This speech processing is roughly divided into generation network generation processing and speech synthesis processing. The generation network is a neural network to be used for speech synthesis. The generation network generation processing is processing for generating a generation network by machine learning. The speech synthesis processing is processing of synthesizing speech corresponding to fixed settings and uncertain settings designated by the user of the speech processing apparatus 1 using the generation network as a vocoder (speech synthesis model). The fixed settings are settings that define speech quality of speech to be synthesized (that is, fixed settings for each speaker). Specific examples of the fixed settings include gender, age, height, weight, speaking speed, and accent of the speaker. The uncertain settings are settings that change in a fluid manner in accordance with utterance content. Specific examples of the uncertain settings include text (character string) representing utterance content and emotions to be given to speech to be synthesized.

As described above, the control unit 10 which implements the OS reads out the speech processing program 322 from the nonvolatile storage unit 320 to the volatile storage unit 310 when an instruction to execute the speech processing program 322 is given via the operating unit 220, and starts execution of the speech processing program 322. When an instruction to execute the generation network generation processing is given by operation on the operating unit 220, the control unit 10 which operates in accordance with the speech processing program 322 encourages the user to utter with his/her face turned to the imaging unit 240 by a message displayed on the display unit 210 or a speech message output from the speech input/output unit 230, and activates the imaging unit 240. When the user who is encouraged to utter in the above manner utters with his/her face turned to the imaging unit 240, the uttered speech is picked up by the microphone of the speech input/output unit 230, and a moving image representing temporal change (change of expression) of the face of the user in the utterance period is captured by the imaging unit 240.

Figure 2:
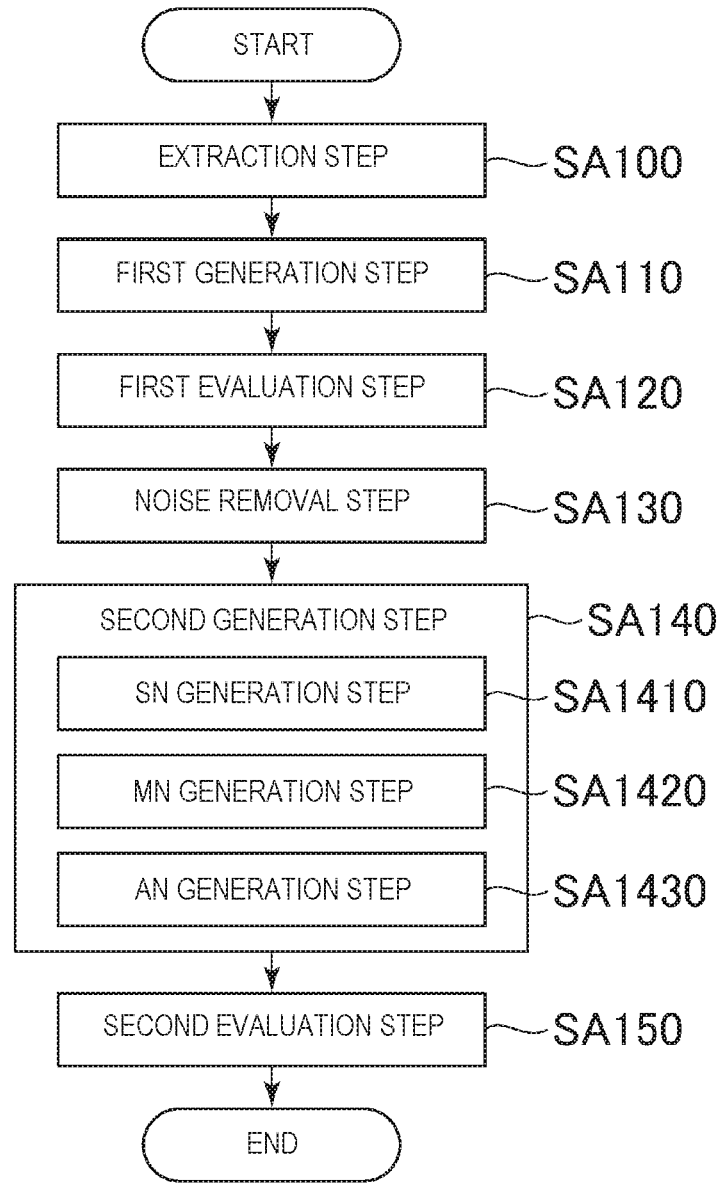
FIG. 2 is a flowchart illustrating flow of generation network generation processing to be executed by a control unit 10 of the speech processing apparatus 1 in accordance with a speech processing program 322.

When picking up of the uttered speech and capturing of the moving image in the utterance period are completed, the control unit 10 starts generation network generation processing. FIG. 2 is a flowchart illustrating flow of the generation network generation processing. As illustrated in FIG. 2, the generation network generation processing of the present embodiment includes six steps of an extraction step SA100, a first generation step SA110, a first evaluation step SA120, a noise removal step SA130, a second generation step SA140, and a second evaluation step SA150. The processing to be executed by the control unit 10 in each of these six steps are as follows.

In the extraction step SA100, the control unit 10 separates the moving image data output from the imaging unit 240 (that is, moving image data obtained by imaging the face of the speaker in the utterance period) into frames having a predetermined time length (for example, 1/60 seconds), and performs processing in accordance with face feature point extraction algorithm for each frame to extract face feature point data indicating positions of face feature points determined in advance, for each frame. Specific examples of the face feature points include points on outline of face components such as eyebrows, eyes, nose, and lips. It is only necessary to use algorithm in the existing face recognition technique as appropriate as the face feature point extraction algorithm.

In the first generation step SA110, the control unit 10 first separates the speech data output from the speech input/output unit 230 into frames having the above-described predetermined time length, and performs processing in accordance with the speech feature extraction algorithm for each frame to extract speech feature data indicating speech features for each frame. For example, in a case where a sampling frequency at the A/D converter of the speech input/output unit 230 is 44.1 kHz, the speech data corresponding to one second is a sample sequence including 44100 samples. In this case, the speech data corresponding to one frame is a sample sequence including 44100/60=735 samples. Specific examples of the speech feature data include a basic frequency, a spectrum envelope, a formant, and the like. It is only necessary to use algorithm in the existing speech analysis technique as appropriate as the speech feature extraction algorithm. Next, the control unit 10 generates a neural network (hereinafter, referred to as a first generation network) for generating facial feature points of each frame from the speech feature data of the corresponding frame by machine learning. The reason why machine learning is performed using speech feature data and face feature point data instead of speech data and moving image data is to reduce an amount of data to be processed and reduce processing load of machine learning. It is only necessary to use the existing algorithm as appropriate as the machine learning algorithm.

In the first evaluation step SA120 subsequent to the first generation step SA110, the control unit 10 generates a neural network (hereinafter, referred to as a first identification network) for evaluating whether or not the first generation network is appropriate by machine learning, and evaluates whether or not the first generation network is appropriate using the face feature point data extracted from each frame. Typically, in a hostile generation network, the machine learning of the generation network is performed for the purpose of being able to successfully deceive the identification network side (in the present embodiment, for the purpose of making it impossible to distinguish between the face feature points extracted from the frames and the face feature points generated by the first generation network). On the other hand, the machine learning of the identification network is performed for the purpose of being able to successfully distinguish between the face feature points extracted from the frames of the moving image data and the face feature points generated by the generation network. This relationship is expressed by the following Formula 1. In Formula 1, G(z) is the face feature point generated by the first generation network, and D(x) is a probability that the first identification network correctly identifies that x is not fake (that is, the face feature points extracted from the frame of the moving image data). The better identification capability of the identification network gets, the greater a value of the first term on the right side becomes, and the smaller a value of D(G(z)) becomes, the greater a value of the second term on the right side becomes. On the other hand, when the generation network can successfully deceive the identification network, the value of D(G(z)) becomes greater and the value of the second term on the right side becomes smaller.

Formula 1

$$\min_G \max_D V(D, G) = E_{x \sim P_{data}(x)}[\log(D(x))] + E_{z \sim P_z(z)}[\log(1 - D(G(z)))]$$

Figure 3:
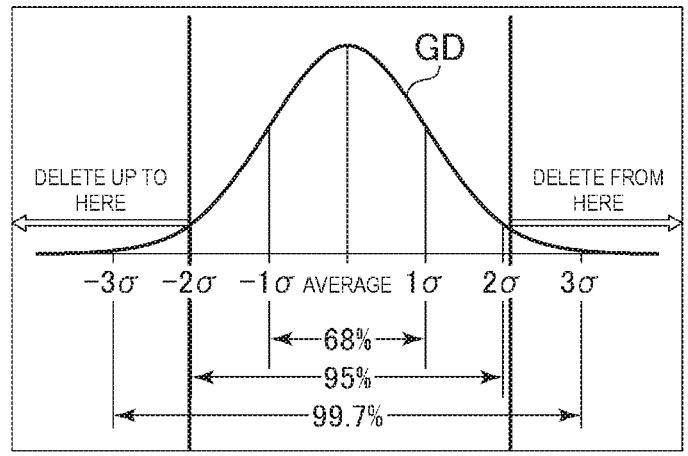
FIG. 3 is a view for explaining processing to be executed by the control unit 10 in a noise removal step SA130 of the generation network generation processing.

In the noise removal step SA130 subsequent to the first evaluation step SA120, the control unit 10 removes noise from the face feature points generated by the first generation network evaluated as appropriate in the first evaluation step SA120. More specifically, the control unit 10 calculates Gaussian distribution GD (see FIG. 3) on the basis of all the face feature points generated by the first generation network evaluated as appropriate in the first evaluation step SA120, and, as illustrated in FIG. 3, removes data whose absolute value of standard deviation is $2\sigma$ or greater as noise. As illustrated in FIG. 3, $\sigma$ is a value such that 68% of all the face feature points generated by the first generation network evaluated as appropriate in the first evaluation step SA120 falls within a range from $-1X\sigma$ to $+1X\sigma$, and 95% falls within a range from $-2X\sigma$ to $+2X\sigma$.

Figure 4:
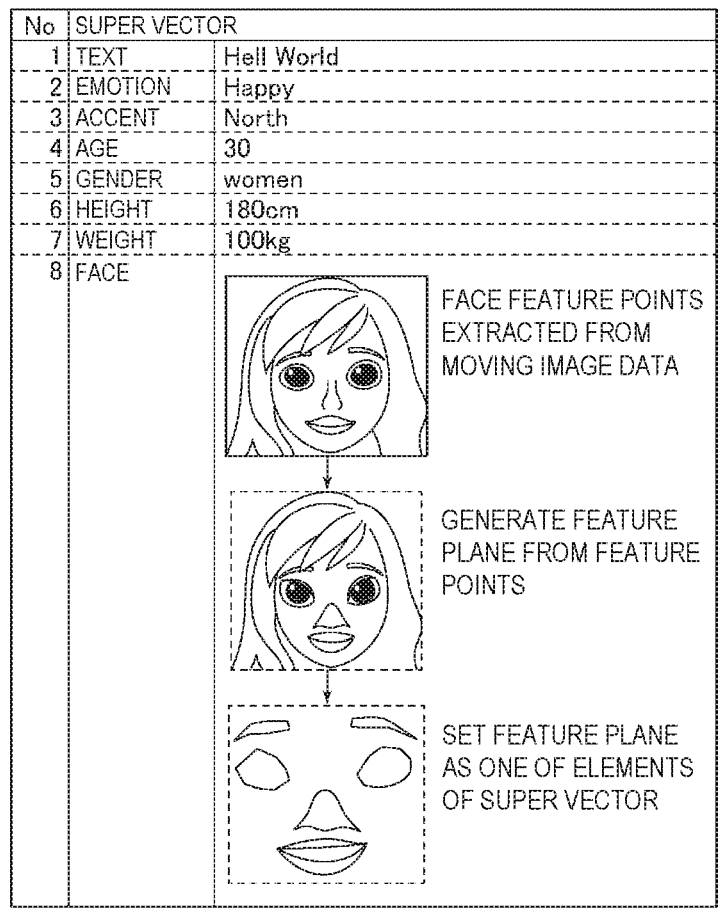
FIG. 4 is a view illustrating an example of a super vector to be generated by the control unit 10 in a second generation step SA140 of the generation network generation processing.

In the second generation step SA140 subsequent to the noise removal step SA130, the control unit 10 causes the user to designate a plurality of types of uncertain settings including at least text representing the utterance content of the uttered speech and information indicating emotions included in the uttered speech, and causes the user to designate a plurality of types of fixed settings which define speech quality of the speaker. Next, the control unit 10 generates a super vector (see FIG. 4) including as elements the fixed settings and the uncertain settings, and a feature plane generated from the face feature points generated by the first generation network evaluated as appropriate in the first evaluation step SA120. This super vector is associated with the first generation network via the above-described feature plane.

Next, the control unit 10 generates a neural network (hereinafter, referred to as a second generation network) for generating uttered speech picked up with the microphone upon start of the generation network generation processing from the plurality of types of fixed settings and the plurality of types of uncertain settings designated by the user as settings for the uttered speech, through machine learning using the super vector. The reason why machine learning is performed using the super vector instead of speech data and moving image data is to reduce an amount of data to be processed and reduce processing load of the machine learning. It is only necessary to use the existing algorithm as the machine learning algorithm to be used in the second generation step SA140.

Figure 5:
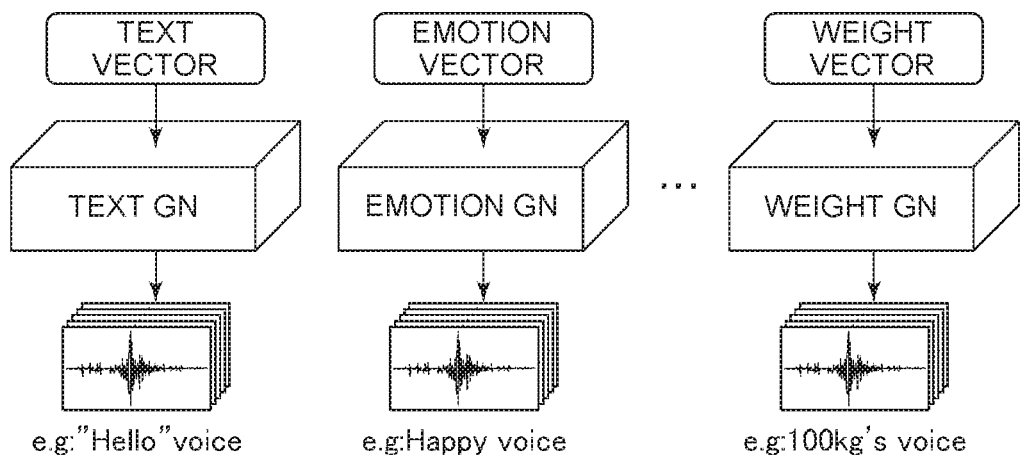
FIG. 5 is a view illustrating an example of processing of a single network generation step SA1410 to be executed by the control unit 10 in the second generation step SA140 of the generation network generation processing.

More specifically, the second generation step SA140 includes three steps: a single network generation step SA1410, a multi-network generation step SA1420, and an all-network generation step SA1430. Note that, in FIG. 2, a "single network" is abbreviated as an "SN", a "multi-network" is abbreviated as an "MN", and an "all-network" is abbreviated as an "AN". Hereinafter, the same notations are used in the present specification. In the SN generation step SA410, as illustrated in FIG. 5, the control unit 10 generates a second generation network for each of the settings included in the super vector. FIG. 5 illustrates processing of generating a second generation network (a text GN, an emotion GN, and a weight GN) corresponding to respective settings of text and emotions which belong to the uncertain settings, and the weight among the fixed settings.

Figure 6:
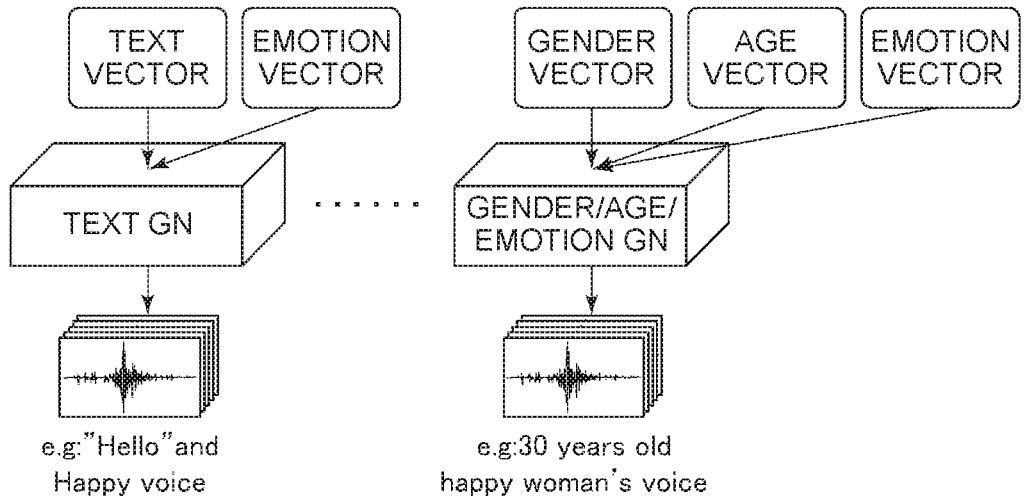
FIG. 6 is a view illustrating an example of processing of a multi-network generation step SA1420 to be executed by the control unit 10 in the second generation step SA140 of the generation network generation processing.

In the MN generation step SA1420, as illustrated in FIG. 6, the control unit 10 generates the second generation network so that, for each combination of a plurality of settings except at least one setting among the plurality of types of settings included in the super vector, each of these plurality of settings does not affect other settings. For example, FIG. 6 illustrates processing of generating a second generation network (the text GN and the emotion GN) corresponding to combination of two settings of text and emotions, and processing of generating a second generation network (the gender GN, the age GN and the emotion GN) corresponding to combination of three settings of gender, age and emotions.

Figure 7:
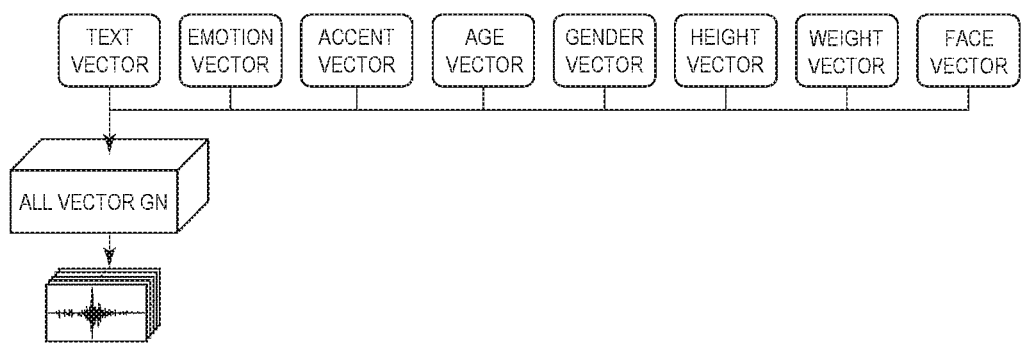
FIG. 7 is a view illustrating an example of processing of an all-network generation step SA1430 to be executed by the control unit 10 in the second generation step SA140 of the generation network generation processing.

In the AN generation step SA1430, as illustrated in FIG. 7, the control unit 10 generates the second network (all-vector GN) so that each setting does not affect other settings for all the settings included in the super vector.

In the second evaluation step SA150 subsequent to the second generation step SA140, the control unit 10 generates a neural network (hereinafter, referred to as a second identification network) for evaluating whether or not the second generation network generated in the second generation step SA140 is appropriate using the speech data output from the speech input/output unit 230, by machine learning, and evaluates the second generation network using the second identification network. Then, the control unit 10 writes data of the second generation network evaluated as appropriate in a predetermined storage area of the nonvolatile storage unit 320. Note that, it is only necessary to use the existing algorithm as appropriate as the machine learning algorithm to be used in the second evaluation step SA150.

The processing of the generation network generation processing has been described above.

Next, speech synthesis processing will be described.

Figure 8:
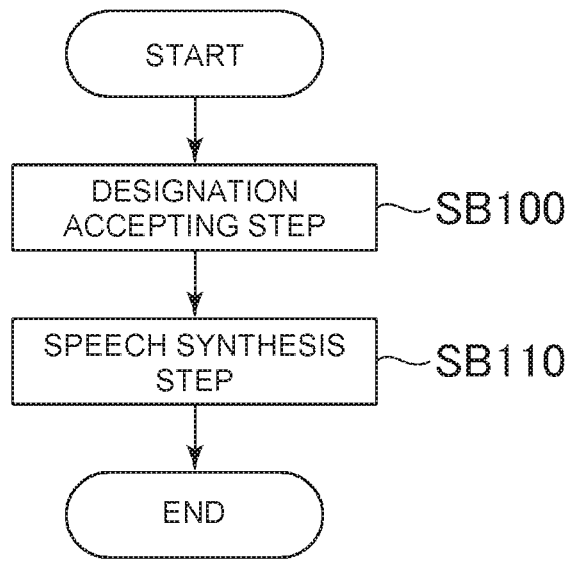
FIG. 8 is a flowchart illustrating flow of speech synthesis processing to be executed by the control unit 10 of the speech processing apparatus 1 in accordance with the speech processing program 322.

The control unit 10 which operates in accordance with the speech processing program 322 starts speech synthesis processing when an instruction to execute the speech synthesis processing is given by operation on the operating unit 220. This speech synthesis processing is processing of synthesizing speech which has speech quality corresponding to the fixed settings designated by the user and which has the utterance content and emotions corresponding to the uncertain settings designated by the same user, using the second generation network stored in the above-described storage area. FIG. 8 is a flowchart illustrating flow of the speech synthesis processing. As illustrated in FIG. 8, the speech synthesis processing of the present embodiment includes two steps: a designation accepting step SB100 and a speech synthesis step SB110. The processing to be executed by the control unit 10 in each of these two steps is as follows.

Figure 9:
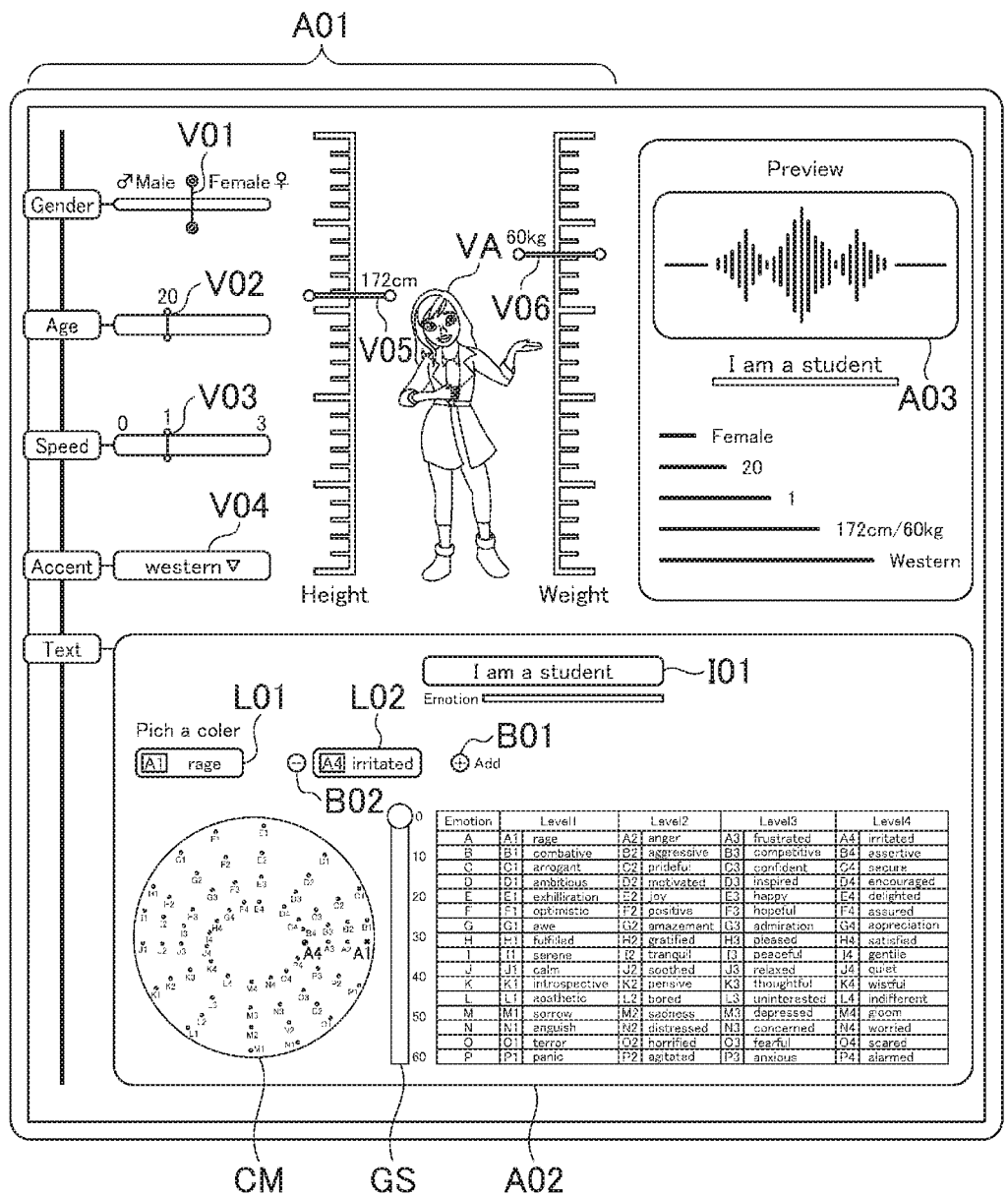
FIG. 9 is a view illustrating an example of a UI screen which is caused to be displayed on a display unit 210 by the control unit 10 in a designation accepting step SB100 of the speech synthesis processing.

In the designation accepting step SB100, the control unit 10 encourages the user to designate fixed settings and uncertain settings for speech to be synthesized. More specifically, the control unit 10 causes the UI screen illustrated in FIG. 9 to be displayed at the display unit 210. As illustrated in FIG. 9, the UI screen is provided with a fixed setting designation area A01, an uncertain setting designation area A02, and a preview area A03. In the preview area A03, after execution of the speech synthesis step SB110 is completed, a waveform of the speech synthesized in the speech synthesis step SB110 is displayed.

As illustrated in FIG. 9, the fixed setting designation area A01 is provided with virtual operators V01 to V06 for allowing the user to designate each of the fixed settings of gender, age, speaking speed, accent, height, and weight. The user can designate each of the fixed settings of gender, age, speaking speed, accent, height, and weight by operating each of the virtual operators V01 to V06 through touch operation, or the like, on the operating unit 220. The gender is not limited to binary designation such as male and female, but may be designated continuously between male and female.

In the present embodiment, default values are set for the respective fixed settings of gender, age, speaking speed, accent, height, and weight, and at a time point of start of the speech synthesis processing, the control unit 10 displays an avatar image VA in accordance with the above-described default values in the center of the fixed setting designation area A01. Then, the control unit 10 changes the avatar image VA in accordance with operation of the virtual operators V01 to V06. Note that, it is, of course, possible to omit display of the avatar image VA.

In the uncertain setting designation area A02, a text input area 101 for allowing the user to designate (input) text (character string) representing the utterance content of the speech to be synthesized, and emotion designation lists L01 and L02 (or color map CM and a gray scale GS) for allowing the user to designate emotions to be included in the speech to be synthesized, with colors, are provided. Because input of text to the text input area 101 is not particularly different from input of text on a typical smartphone, such as, for example, using a virtual keyboard, detailed description will be omitted, and in the following, a method for designating emotions to be included in the speech to be synthesized will be mainly described.

In the present embodiment, it is possible to allow the user to designate 64 emotions from "rage" to "alarmed" illustrated in FIGS. 10 and 11 with colors. As illustrated in FIGS. 10 and 11, the 64 emotions are classified in advance into 16 types of A to P in accordance with types of emotions and 4 types of level=1 to 4 in accordance with strength of the emotion. A unique color is associated with each of the above-described six emotions in advance. The nonvolatile storage unit 320 of the speech processing apparatus 1 stores a table in which data indicating respective values (see FIGS. 10 and 11) of colors of C (cyan), M (magenta), Y (yellow) and K (black) associated with emotions indicated by emotion identifiers is stored in association with the emotion identifiers (for example, a character string such as "rage") uniquely indicating the respective 64 emotions. While, in the present embodiment, the colors associated with emotions are expressed in the CMYK color system, the RGB color system may be used, and, in FIGS. 10 and 11, respective values of R (red), G (green) and B (blue) in the RGB color system are also described. However, because the CMYK color system has one more coordinate axis than the RGB color system and is suitable for associating colors with various emotions, it is preferable to use the CMYK color system.

In the present embodiment, the user can designate emotions to be included in the speech to be synthesized by either operation on the emotion designation lists L01 and L02 or operation on the color map CM and the gray scale GS. Each of the emotion designation list L01 and L02 are list boxes which display lists of the above-described 64 types of emotion identifiers. The user can designate emotions to be included in the speech to be synthesized by performing selection operation on the list box. A +button B01 in FIG. 9 is a virtual operator for allowing the user to give an instruction to add an emotion designation list, and a –button B02 is a virtual operator for allowing the user to give an instruction to delete the displayed emotion designation list. While, in FIG. 9, the UI screen having two emotion designation lists is illustrated, in a state immediately after the UI screen is displayed, only one emotion designation list is displayed. Further, in the present embodiment, the number of emotions which can be designated for one text (the number of emotion designation lists which can be displayed on the UI screen) is determined in accordance with a length of the text (character string length), and the number increases as the text is longer. In the present embodiment, by designating a plurality of emotions for one text, it is possible to designate continuous temporal change of emotions (emotional ups and downs) along a time axis starting from the beginning of the text.

The color map CM is an input area for allowing the user to designate values of C, M, and Y among color components of colors associated with the emotions, and the gray scale GS is an input area for allowing the user to designate a value of K among the color components of the same colors. The user can designate emotions to be included in the speech to be synthesized by performing tap operation on each of the color map CM and the gray scale GS. It is also possible to designate continuous temporal change of emotions (emotional ups and downs) along a time axis starting from the beginning of the text also through operation on each of the color map CM and the gray scale GS.

Figure 12:
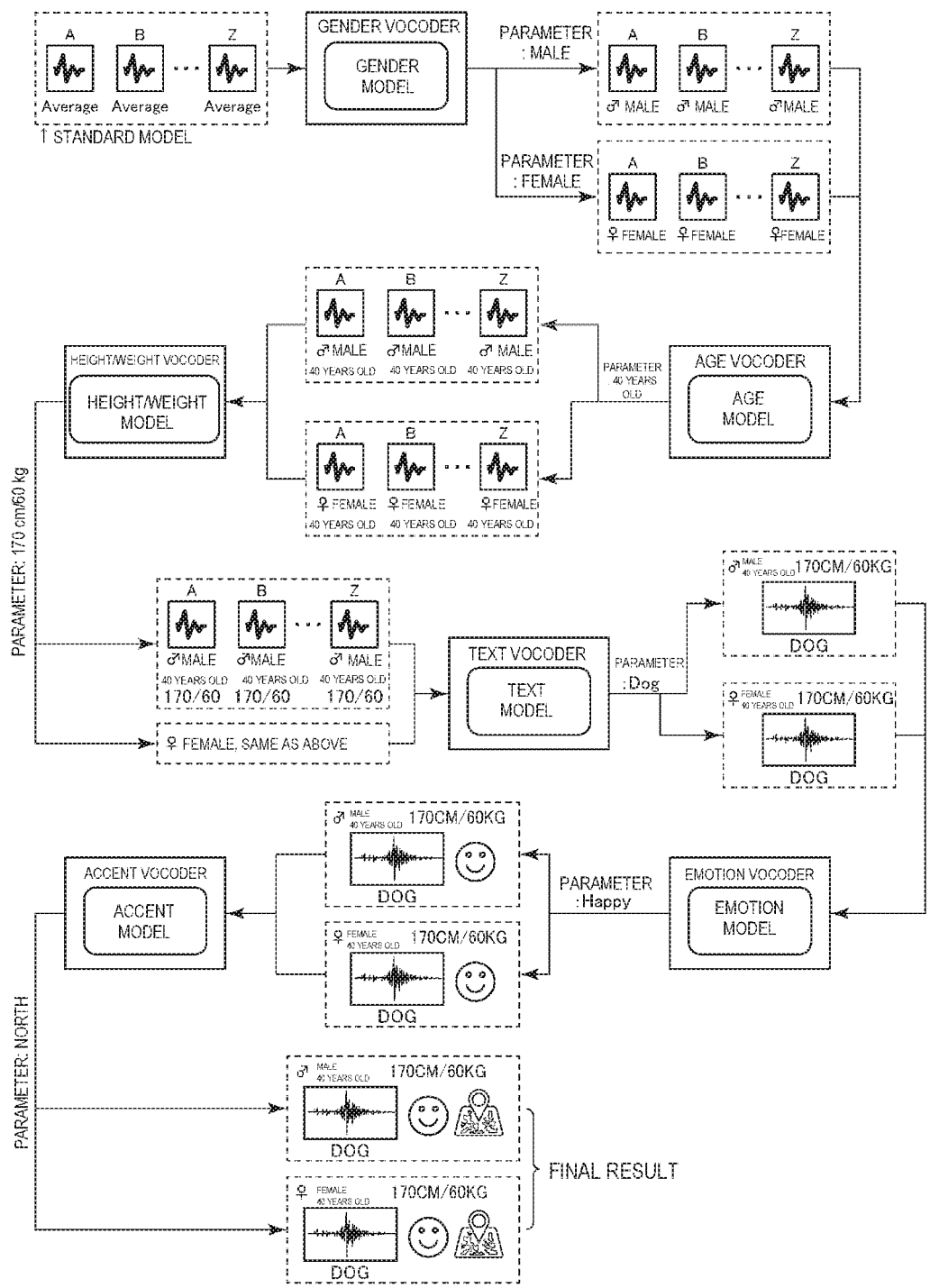
FIG. 12 is a view illustrating an example of processing of a speech synthesis step SB110 of the speech synthesis processing.

In the speech synthesis step SB110 subsequent to the designation accepting step SB100, the control unit 10 synthesizes speech corresponding to the fixed settings and the uncertain settings accepted in the designation accepting step SB100 using the second generation network evaluated as appropriate in the second evaluation step SA150. More specifically, the control unit 10 uses the above-described second generation network as a vocoder corresponding to each of the settings accepted in the designation accepting step SB100, provides a value of each of the settings accepted in the designation accepting step SB100 to the vocoder as a parameter, and, as illustrated in FIG. 12, sequentially activates the vocoder, synthesizes the speech and emits the synthesized speech from the speaker of the speech input/output unit 230. FIG. 12 illustrates a case where a gender vocoder, an age vocoder, a height/weight vocoder, a text vocoder, an emotion vocoder, and an accent vocoder are activated in this order to synthesize the speech as a final result.

As described above, according to the speech processing apparatus 1 of the present embodiment, it is possible to generate the second generation network for synthesizing emotional speech while taking into account the fixed settings of the speaker, and it is possible to synthesize emotional speech while taking into account the fixed setting of the speaker using the second generation network to synthesize the speech.

While an embodiment of the present invention has been described above, it is, of course, possible to add the following modifications to the above-described embodiment.

(1) While, in the above-described embodiment, speech is generated by sequentially activating the vocoders of gender, age, . . . , accent, the order in which the vocoders are activated may be changed. However, it is preferable to activate the vocoder relating to the uncertain settings after activating the vocoder relating to the fixed settings such as gender, age, weight and accent.

(2) While, in the above-described embodiment, an example where the present invention is applied to speech output application in a smartphone has been described, the present invention may be applied to generation of speech of characters in a computer game and animation, or the present invention may be applied to generation of dialogue speech in a speech dialogue system such as telephone answering.

(3) In the above-described embodiment, a program (speech processing program 322) for causing the control unit 10 to execute the generation network generation processing and the speech synthesis processing which prominently represent the features of the present invention is stored in advance in the nonvolatile storage unit 320 of the speech processing apparatus 1. However, the above-described program may be manufactured and sold alone. Specific examples of the mode in which the program is manufactured and sold alone include a mode in which the program is written and distributed on a computer-readable recording medium such as a flash memory, and a mode in which the program is distributed by being downloaded via a telecommunication line such as the Internet. By the program distributed in accordance with these modes being installed in an information terminal having a computer (CPU), such as a smartphone, a personal computer, and a tablet terminal, and the computer of the information terminal being caused to operate in accordance with the installed program, it becomes possible to make a typical information terminal function as the speech processing apparatus of the present invention.

(4) While the speech processing apparatus 1 of the above-described embodiment includes the user interface unit 20 as a component, the user interface unit 20 may be an external component which enables data exchange with the control unit 10 via a communication line such as a USB cable or a telecommunication line such as the Internet, and the storage unit 30 may be also an external component which enables data exchange with the control unit 10 via a communication line or a telecommunication line such as the Internet. In short, the speech processing apparatus of the present invention only needs to include the control unit 10 which executes the generation network generation processing and the speech synthesis processing.

(5) While the generation network generation processing of the above-described embodiment includes the noise removal step SA130, in a case where reduction of processing load is prioritized over influence of noise, the noise removal step SA130 may be omitted. In short, the generation network of the present invention only needs to include the extraction step SA100, the first generation step SA110, the first evaluation step SA120, the second generation step SA140, and the second evaluation step SA150.

(6) While the speech processing apparatus 1 of the above-described embodiment executes the generation network generation processing and the speech synthesis processing, a speech processing apparatus which executes only the former processing may be provided. Further, means which execute respective steps included in the generation network generation processing and respective steps included in the speech synthesis processing may be configured with hardware such as an electronic circuit, and the speech processing apparatus 1 may be configured by combining these means. For example, each of the extracting means which executes the processing in the extraction step SA100, the first generating means which executes the processing in the first generation step SA110, the first evaluating means which executes the processing in the first evaluation step SA120, the second generating means which executes the processing in the second generation step SA140 and the second evaluating means which executes the processing in the second evaluation step SA150 may be configured with an electronic circuit, and the speech processing apparatus of the present invention may be configured by combining these means. Further, each means of the designation accepting means which executes the processing in the designation accepting step SB100, and the speech synthesizing means which executes the processing in the speech synthesis step SB110 may be configured with an electronic circuit, and the speech processing apparatus may be configured by further combining these means.

The invention claimed is:

1. A speech processing apparatus comprising:
an extracting means configured to separate moving image data obtained by imaging a face of a speaker in an utterance period into frames having a predetermined time length, and extract face feature point data indicating positions of face feature points determined in advance, for each frame;
a first generating means configured to separate speech data representing uttered speech of the speaker in the utterance period into the frames and generate a first generation network for generating face feature points of each frame from speech feature data of the corresponding frame;
a first evaluating means configured to evaluate whether or not the first generation network is appropriate using the face feature point data extracted from each frame using a first identification network;
a second generating means configured to cause a user to designate a plurality of types of uncertain settings including at least text representing utterance content of the uttered speech and information indicating emotions included in the uttered speech, cause the user to designate a plurality of types of fixed settings which define speech quality of the speaker, and generate a second generation network for generating the uttered speech from the face feature points generated by the first generation network evaluated as appropriate by the first evaluating means, the plurality of types of fixed settings and the plurality of types of uncertain settings designated by the user; and
a second evaluating means configured to evaluate whether or not the second generation network is appropriate using the speech data using a second identification network.

2. The speech processing apparatus according to claim 1, further comprising:
a designation accepting means configured to encourage the user to designate fixed settings and uncertain settings for speech to be synthesized; and
a speech synthesizing means configured to synthesize speech corresponding to the fixed settings and the uncertain settings designated for the designation accepting means using the second generation network evaluated as appropriate by the second evaluating means.

3. The speech processing apparatus according to claim 2, wherein the designation accepting means displays a color map in which different colors are associated with respective emotions, on a display apparatus, and causes the user to designate emotions to be included in speech to be synthesized through designation of colors.

4. The speech processing apparatus according to claim 2, wherein the designation accepting means accepts more designations of information indicating emotions as a character string length of text is longer.

5. The speech processing apparatus according to claim 1, wherein the second generating means comprises:
a single network generating means configured to generate the second generation network for each setting of the plurality of types of fixed settings and the plurality of types of uncertain settings;
a multi-network generating means configured to generate the second generation network so that, for each combination of a plurality of settings except at least one setting among the plurality of types of fixed settings and the plurality of types of uncertain settings, each of the plurality of settings does not affect other settings; and
an all-network generating means configured to generate the second generation network so that each of the plurality of types of fixed settings and the plurality of types of uncertain settings does not affect other settings.

6. A computer program product embodying computer readable instructions stored on a non-transitory computer-readable medium for causing a computer to execute the computer readable instructions by a processor so as to perform the steps of:
separating moving image data obtained by imaging a face of a speaker in an utterance period into frames having a predetermined time length and extracting face feature point data indicating positions of face feature points determined in advance, for each of the frames;
separating speech data representing uttered speech of the speaker in the utterance period into the frames and generating a first generation network for generating the face feature points of each of the frames from speech feature data of a corresponding frame of the frames;
first evaluating whether or not the first generation network is appropriate using the face feature point data extracted from each of the frames using a first identification network;
causing a user to designate a plurality of types of uncertain settings including at least text representing utterance content of the uttered speech and information indicating emotions included in the uttered speech, causing the user to designate a plurality of types of fixed settings which define speech quality of the speaker, and generating a second generation network for generating the uttered speech from the face feature points generated by the first generation network evaluated as appropriate in the first evaluation, the plurality of types of fixed settings and the plurality of types of uncertain settings designated by the user; and
second evaluating whether or not the second generation network is appropriate using the speech data using a second identification network.

7. The computer program product according to claim 6, for causing the computer to further execute the computer readable instructions by the processor so as to perform the steps of:
encouraging the user to designate fixed settings and uncertain settings for speech to be synthesized; and
synthesizing speech corresponding to the designated fixed settings and the designated uncertain settings by the user using the second generation network evaluated as appropriate in the second evaluation.

8. The speech processing apparatus according to claim 3, wherein the designation accepting means accepts more designations of information indicating emotions as a character string length of text is longer.

9. The speech processing apparatus according to claim 2, wherein the second generating means comprises:
a single network generating means configured to generate the second generation network for each setting of the plurality of types of fixed settings and the plurality of types of uncertain settings;
a multi-network generating means configured to generate the second generation network so that, for each combination of a plurality of settings except at least one setting among the plurality of types of fixed settings and the plurality of types of uncertain settings, each of the plurality of settings does not affect other settings; and an all-network generating means configured to generate the second generation network so that each of the plurality of types of fixed settings and the plurality of types of uncertain settings does not affect other settings.

10. The speech processing apparatus according to claim 3, wherein the second generating means comprises:

a single network generating means configured to generate the second generation network for each setting of the plurality of types of fixed settings and the plurality of types of uncertain settings;

a multi-network generating means configured to generate the second generation network so that, for each combination of a plurality of settings except at least one setting among the plurality of types of fixed settings and the plurality of types of uncertain settings, each of the plurality of settings does not affect other settings; and an all-network generating means configured to generate the second generation network so that each of the plurality of types of fixed settings and the plurality of types of uncertain settings does not affect other settings.

11. The speech processing apparatus according to claim 4, wherein the second generating means comprises:

a single network generating means configured to generate the second generation network for each setting of the plurality of types of fixed settings and the plurality of types of uncertain settings;

a multi-network generating means configured to generate the second generation network so that, for each combination of a plurality of settings except at least one setting among the plurality of types of fixed settings and the plurality of types of uncertain settings, each of the plurality of settings does not affect other settings; and an all-network generating means configured to generate the second generation network so that each of the plurality of types of fixed settings and the plurality of types of uncertain settings does not affect other settings.

12. The speech processing apparatus according to claim 8, wherein the second generating means comprises:

a single network generating means configured to generate the second generation network for each setting of the plurality of types of fixed settings and the plurality of types of uncertain settings;

a multi-network generating means configured to generate the second generation network so that, for each combination of a plurality of settings except at least one setting among the plurality of types of fixed settings and the plurality of types of uncertain settings, each of the plurality of settings does not affect other settings; and an all-network generating means configured to generate the second generation network so that each of the plurality of types of fixed settings and the plurality of types of uncertain settings does not affect other settings.

* * * * *